Jan. 4, 1927.
T. LEVETT
1,613,280
WINDSHIELD CLEANER
Filed Dec. 15, 1925  2 Sheets-Sheet 1
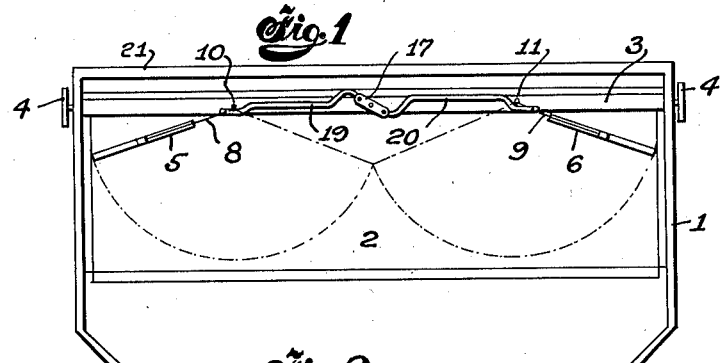
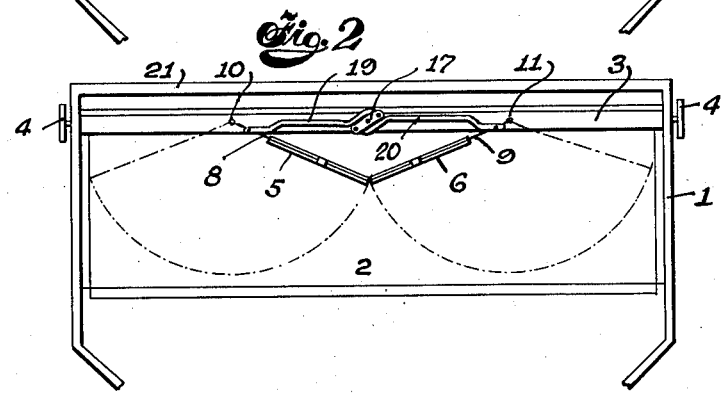
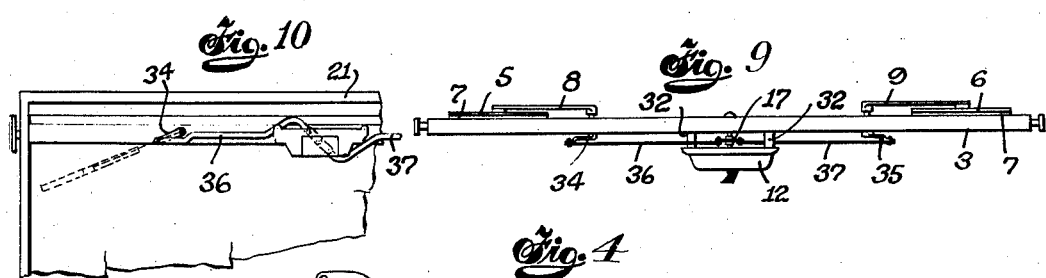
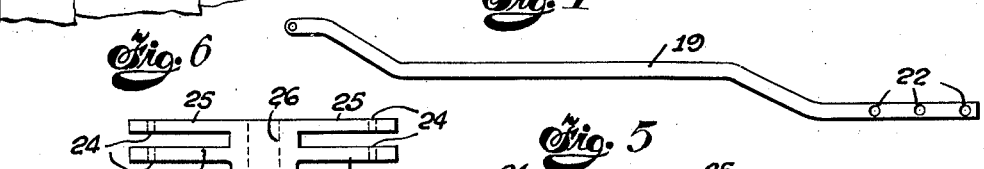
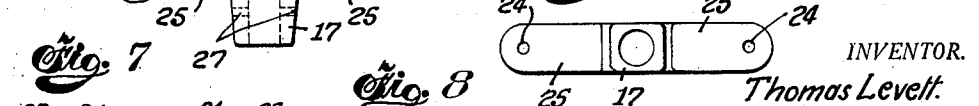
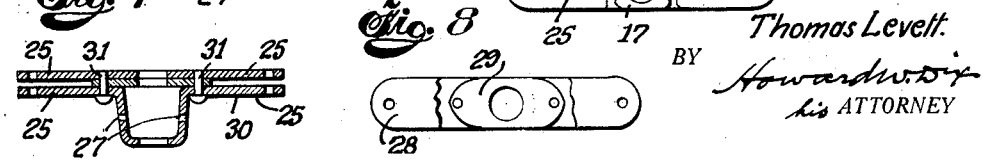
INVENTOR.
Thomas Levett.
BY
Howard W. Dix
his ATTORNEY Jan. 4, 1927.
T. LEVETT
1,613,280
WINDSHIELD CLEANER
Filed Dec. 15, 1925          2 Sheets-Sheet 2
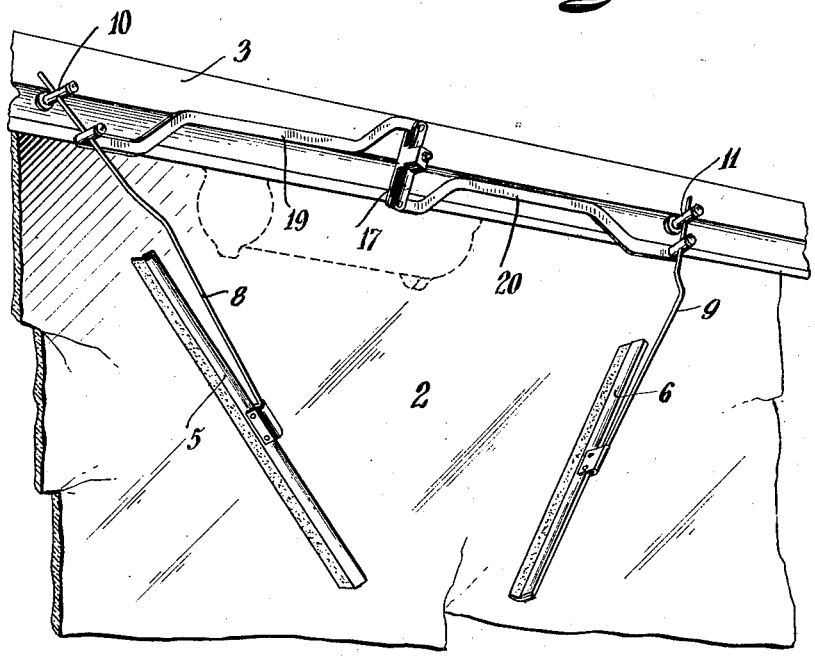
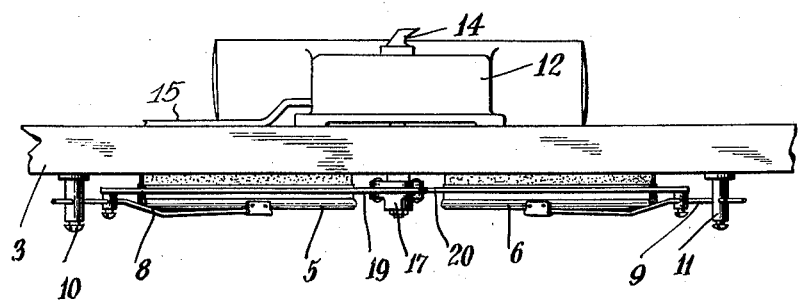
Inventor
Thomas Levett
By his Attorney
Howard W. Dix Patented Jan. 4, 1927.

1,613,280

UNITED STATES PATENT OFFICE.

THOMAS LEVETT, OF NEW YORK, N. Y.

WINDSHIELD CLEANER.

Application filed December 15, 1925. Serial No. 75,495.

This invention relates to window cleaning devices, and in particular it has to do with a novel and improved cleaning device for that window of an automobile known as the windshield. It is to be understood, however, that the principle of operation may be incorporated in devices for cleaning other automobile windows, or windows provided for other purposes.

An object of this invention is to provide a novel construction of a window cleaner device having two pivoted wipers or cleaners and to so operate the wipers in an improved manner as to eliminate in so far as possible the interruption of vision by the wipers.

The particular object of this invention is to provide an improved construction and operation of a windshield wiper device having two pivoted wipers adapted to oscillate in their normal operation, and to so construct this improved device as to have no interruption of vision when the device is not operating and to have interruption throughout the length of the windshield only at intervals during operation.

A further particular object of this invention is to provide a novel windshield wiping device employing pivotally mounted wipers for oscillation over the windshield, and to so construct and operate this device that the wipers will move toward each other at the same time and will move away from each other in their next movement and when in non-operative position will have both wipers out of the line of vision.

Other objects and advantages of this invention will be appreciated as the description below is read.

The preferred form of the novel and improved windshield cleaning device is herein disclosed in the accompanying drawings, wherein Fig. 1 is a front view of a windshield showing a part of an improved wiping device mounted thereon and with the wipers extended;

Fig. 2 is the same as Fig. 1 except that the wipers are shown in their contracted or near positions;

Fig. 3 is a top plan view of the improved windshield wiping device assembled in position;

Fig. 4 is an enlarged view of one of the connecting links;

Fig. 5 is a top plan view of a connecting cross-piece;

Fig. 6 is an elevational view of the cross-piece illustrated in Fig. 5;

Fig. 7 is a modified form of connecting block made of separate elements fastened together;

Fig. 8 is a top plan view of the block illustrated in Fig. 7 and is partially broken away to show a spacer;

Fig. 9 is a top plan view of a modified construction of windshield cleaner assembled in position;

Fig. 10 is an elevational view of part of the modified construction shown in Fig. 9 and a portion of the windshield; and Fig. 11 is a perspective view showing the apparatus in detail.

It is well recognized that cleaning devices have been provided for some time for windows, and that special forms thereof have been provided for the windshields of automobiles. Referring to the windshield wipers, it is recognized that some of these cleaning devices constitute a single wiper pivoted on some part of the windshield and is so mounted as to be oscillated to clean a space in front of the driver. It is further recognized that there has been provided two of these pivoted oscillating wipers and that they have been driven by means of a motor driving one of the wipers while a connecting link joins the two wipers for driving the second wiper. It is also recognized that there may be a bar or chain connecting a driving motor to the two pivoted oscillating wipers to thereby drive the wipers.

The invention herein is an improvement on all of these devices for it has the advantage of reducing to a minimum the interruption of the driver's vision by reason of the movements of the wipers. This improved type of windshield wiper is so constructed that in its non-operative position both of the wiper elements are entirely out of the range of vision, whether this vision is straight ahead or to one side.

It will be especially noted that with two pivoted oscillating type of wipers or cleaners driven by a bar or chain or connecting link, there will always be one of those wipers in the line of vision of the driver.

When these wipers are in non-operative position one of them for instance the left hand wiper will be out of the line of vision straight ahead but the other one will be directly in the line of vision when looking a bit sidewise to observe pedestrians, signals and machines coming from side streets. This sidewise observation is well recognized as necessary in the successful and safe driving of an automobile. If this vision is interrupted by some apparatus it will be seen that accidents may readily occur or an improper impression be created in the mind of the driver.

The foregoing points have been outlined for the purpose of showing that the present improved windshield wiping device although not radically changing the mechanical constructional features has provided new operation and results and advantages that are very material to the safety of pedestrians, other drivers and occupants, and to the particular driver himself.

The improved type of the windshield wiper herein disclosed and described eliminates all of the above disadvantages and during non-operative condition neither of the wipers is within the range of vision straight ahead or to the right, and a clear vision throughout the length of the windshield is obtained.

During the operations of the wipers of the improved device herein shown, the operator's vision is not interrupted only at intervals when the wipers move together and as the wipers again move apart.

Referring now to the drawings and particularly to Fig. 1 there is illustrated a suitable windshield frame 1 having a glass 2 suitably held in a support 3 which in turn is preferably mounted in the frame 1 by the pivot screws 4. It is to be understood that the windshield may be of any transparent material and of such size as to be readily mounted in the frame 1 to protect the driver or the operator of the automobile. The support 3 may be constructed of any desired material formed into the proper shape to accomplish the purpose of supporting the glass 2. It is usual that this support 3 be formed of a suitable iron rod having an edge of the glass 2 fastened therein. While this disclosure shows a particular type of windshield and frame it will be understood that other forms may be employed.

The improved cleaning or windshield wiper device forming an important part of the invention herein, preferably consists of two wipers 5 and 6 having the rubber feet 7 as illustrated in Fig. 4 for engagement with the glass to clean predetermined areas thereof when these wipers are moved in their paths as indicated in dotted lines in Figures 1 to 3 inclusive. These wipers are preferably supported and carried by rods 8 and 9 which are usually pivoted in support 3 at 10 and 11 respectively. It will be understood that the wiper elements herein referred to at different times constitute the wipers 5 and 6, the rubber feet 7 thereof and the supporting rods 8 and 9. Any suitable means may be employed for moving these wipers over the windshield to clean areas thereof. For this purpose there is herein provided a motor 12 or clock as it is often called. This motor has a control lever 14 for turning it on or off. The motor may be of any particular type, such for instance as an electrical motor connected to the storage battery of the automobile, or a vacuum type motor responsive to the vacuum system of the fuel supply or the vacuum of one of the cylinders. The motor 12 whether operated by the vacuum in the fuel system or the cylinder vacuum receives the vacuum effect through a suitable pipe 15.

The motor 12 is provided with a shaft 16 which preferably extends through the support 3 for carrying a connecting cross-piece 17 on its free end. Any suitable means may be employed for affixing the cross-piece 17 onto the shaft 16. The power developed by the clock or motor 12 is transmitted to the rods 8 and 9 by means of suitable links 19 and 20 which are usually fastened by means of pins to the connecting cross-piece 17 at opposite sides of the point of fastening of this cross-piece to the shaft 16 as will be clearly noted in Figs. 1 and 2. It will be seen that the wiper elements and the motor as fastened to the support 3 are mounted in substantially a single horizontal plane. If desired the motor may be positioned at some other desirable point but it has been found to have given successful operation when mounted as herein shown between the points of pivoting of the wiper elements.

The particular construction and assembly of the elements herein permit the two wiper elements 5 and 6 to move toward each other at the same time and after they have come to their contracted or near positions they reverse directions and move apart at the same time, thus it will be seen that this particular type of windshield cleaning device gives the minimum amount of interruption of the line of vision of the driver as there will be a period during the movment of these wipers that neither will be in the driver's line of vision, whether the driver is looking straight ahead or to one side. It will also be noted that when the wipers are in non-operative positions as illustrated in Figs. 1 and 3 neither of them will intercept the line of vision of the driver irrespective of whether he is looking straight ahead or to the side. Thus in non-operative condition the vision throughout the length of the windshield will be uninterrupted by the wiper elements.

It will be noted that by reason of mounting the driving motor 12 between the points of pivoting of the wiper elements, the mechanical apparatus for causing the wipers to move toward each other and away from each other in synchronism is of greater simpacity than has been heretofore produced.

In the particular construction herein disclosed it is desirable to bend the links 19 and 20 as may be noted in Figs. 1 and 2 so that the wipers 5 and 6 may have maximum swing and, therefore, clean greater areas of the windshield. The left hand end of the link 19 has a downward bend so that it will not engage the pivot point 10 when the wiper 5 is at the end of its travel to the left. For the same reason this link is also bent near its point of connection with the connecting cross-piece 17 as noted especially in Fig. 2 so that the wiper 5 may be brought to the end of its travel at the center of the windshield. This bend near the point of connection with the cross-piece 17 permits the cross-piece to have a full oscillation. For the same reasons the link 20 is bent as illustrated and thus the wiper 6 is permitted to clean a greater area of the windshield. Both of the links 19 and 20 are provided with suitable holes 22 as shown in link 19 in Fig. 5, thus providing a universal link which will permit the wiper supporting rods 8 and 9 to be pivoted at desired points in the support 3.

The particular type of connecting cross-piece 17 which has been satisfactory in the operation of this device is illustrated in Figs. 6 and 7 and is constructed of a unit piece of material such as aluminum, and it is provided with holes 24 for the fastening of the links 19 and 20 between the arms 25 of the cross-piece. In fastening this cross-piece to the motor shaft 16, an opening 26 is provided to receive the shaft, and the pin 18 is inserted through holes 27 and is thereafter headed or otherwise firmly fastened in position.

While the cross-piece 17 may advantageously be constructed of metal which may be readily cast, any other suitable form of connecting cross-piece may be employed. A modified form of connecting cross-piece is illustrated in Figs. 8 and 9 wherein there is provided a flat narrow strip 28 having a spacer 29 assembled thereon and having a bent strip 30 formed as shown in Fig. 8 assembled therewith, and preferably these three elements are fastened together by means of suitable rivets 31 or otherwise as for instance by welding. This construction provides arms 25 between which the links 19 and 20 may be pivoted. It will be understood that while the preferred construction of connecting provides the arms 25, if desired, a single means affixed to the shaft 16 may have the connecting links 19 and 20 connected to it without providing an additional arm 25. The deformed part of strip 30 permits a suitable cotter pin or rivet to be inserted through holes 27 for the purpose of fastening the shaft to this type of connecting cross-piece. It will be seen that the spacer strip 29 has its edges cut away. Such construction makes it easier for the links 19 and 20 to take their positions as noted in Fig. 1.

Referring now to Figs. 10 and 11, there is shown a modified form of construction of the improved windshield wiper. On some automobiles there is provided a visor as a part of the equipment. This visor usually extends outwardly and downwardly from the top of the frame 1. It has been found that some of these visors are positioned so close to the frame that the cross-piece 17 would engage the visor when the lower end of the windshield is pushed outward. Such engagements would puncture the visor or it would bend the shaft 16 of the motor 12 depending upon the construction of the visor. The construction of the novel cleaning device illustrated in Figs. 10 and 11 eliminates this difficulty and provides for the mounting of the motor 12 on the support 3 by means of shims or offsets 32 which will permit the cross-piece 17 to be mounted between the motor 12 and the support 3.

The windshield wiper supporting rods 8 and 9 will be pivoted in the support 3 but will be provided with pins which extend through the support and be provided with offsets such as cranks 34 and 35. These cranks are connected, as illustrated, to the shaft 16 of the motor 12, by means of suitable links 36 and 37, which links may be substantially of the same structure and form as the links illustrated in Figs. 1 and 2. These links 36 and 37 may, however, be of other forms if desired. It will be noted that the links are bent considerably at their inner ends so that they may be properly operated to oscillate the wipers as desired and still not interfere with the shims or offsets 32 which support the motor 12.

With this type of construction it will be noted that the improved windshield wiper herein disclosed may be mounted under the visor of an automobile and be successfully operated in the improved manner as herein disclosed while the windshield 2 may be positioned in a vertical position or at an angle to the vertical for purposes of obtaining ventilation.

One of the particular advantages of the operation of this type of windshield cleaning device is that when the operator is about to make a right hand turn, there is such a goodly proportion of the windshield cleaned by the operation of this improved device that the operator has no trouble whatsoever in noting the condition of traffic and signals in the street in which he wishes to turn. The operator does not therefore have to move to the left in his seat to see through the area cleaned by wiper 5. This advantage of course adds materially to the safety of pedestrians and to the safety of persons riding in the automobile being driven. When this particular improved type of windshield device is in non-operative position both of the wipers are normally positioned materially out of the line of vision of the driver when he is looking straight ahead or when he is looking to one side. Further, by reason of the improved construction of this device these wiper elements in their normal nonoperative positions are positioned within arcs of 30 degrees from the horizontal of support 3. When the wipers are in such positions they do not intercept the straight or crosswise line of vision of the driver or operator.

While I have herein shown a definite form of embodiment of my invention it is to be understood that such modifications as fall within the scope of the claims are considered as being within the scope of my invention.

I claim:

1. In an automobile windshield wiper, the combination of two pivoted wiper elements adapted to be oscillated over the windshield to clean areas thereof, means for driving said wiper elements, and connecting means between said wiper elements and said driving means for causing said elements to move toward each other at the same time and to move away from each other at the same time.

2. In an automobile windshield wiper, the combination of two pivoted wiper elements adapted to be oscillated over said windshield to clean predetermined areas thereof, a common driving means for operating said elements, and connections between said driving means and said elements causing said elements to swing in opposite directions when operated by said driving means and when in normal nonoperative positions to point in opposite directions.

3. In an automobile windshield wiper, the combination of two pivoted wiper elements adapted to be oscillated over a windshield to clean areas thereof, a driving motor for said wiper elements being located between the points of pivoting of said elements, and links connecting said wiper elements and said motor for transmitting power to said wiper elements, said connection including means for actuating the links in opposite directions to cause the wiper elements when operating to move toward each other and away from each other in synchronism.

4. In an automobile windshield wiper, the combination of a plurality of pivoted wiper elements adapted to be oscillated over a windshield to clean areas thereof, a motor having a rock shaft arranged perpendicular to the windshield for operating said wiper elements, a cross-piece firmly fastened to the shaft of said motor, and links connected at one end to said cross-piece on opposite sides of the point of attachment of said cross-piece to said shaft, said links having their other ends connected to said wiper elements to transmit movement thereto from said motor.

5. In an automobile windshield wiper, the combination of two pivoted wiper elements adapted to be oscillated over a windshield to clean areas thereof, a driving motor for said wiper elements being located between the points of pivoting of said elements, means including connecting links between said motor and said wiper elements for moving said elements in opposite directions, said wiper elements and said links being adapted to permit the wipers of said wiper elements to swing to terminal positions close to the horizontal frame bar of the windshield and having the ends of said wipers pointing in opposite directions when in such terminal positions.

6. In an automobile windshield wiper, the combination of two wiper elements pivoted to the top of said windshield and adapted to be oscillated over the windshield to clean areas thereof, each of said wiper elements comprising a wiper, a supporting rod therefor and means for pivoting the rod to said windshield, a motor having a rock shaft and being mounted on said windshield between said wiper elements, a cross-piece fastened to the shaft of said motor and a connecting link fastened to one rod and to one arm of said cross-piece on one side of the point of connection of said cross-piece with said shaft, and a second link connecting the other rod to the other arm of said cross-piece at a point on the opposite side of connection of said cross-piece with said shaft.

THOMAS LEVETT.